Oct. 16, 1923.
H. O. JACKSON
STUFFING BOX
Original Filed Dec. 16, 1919
1,470,621
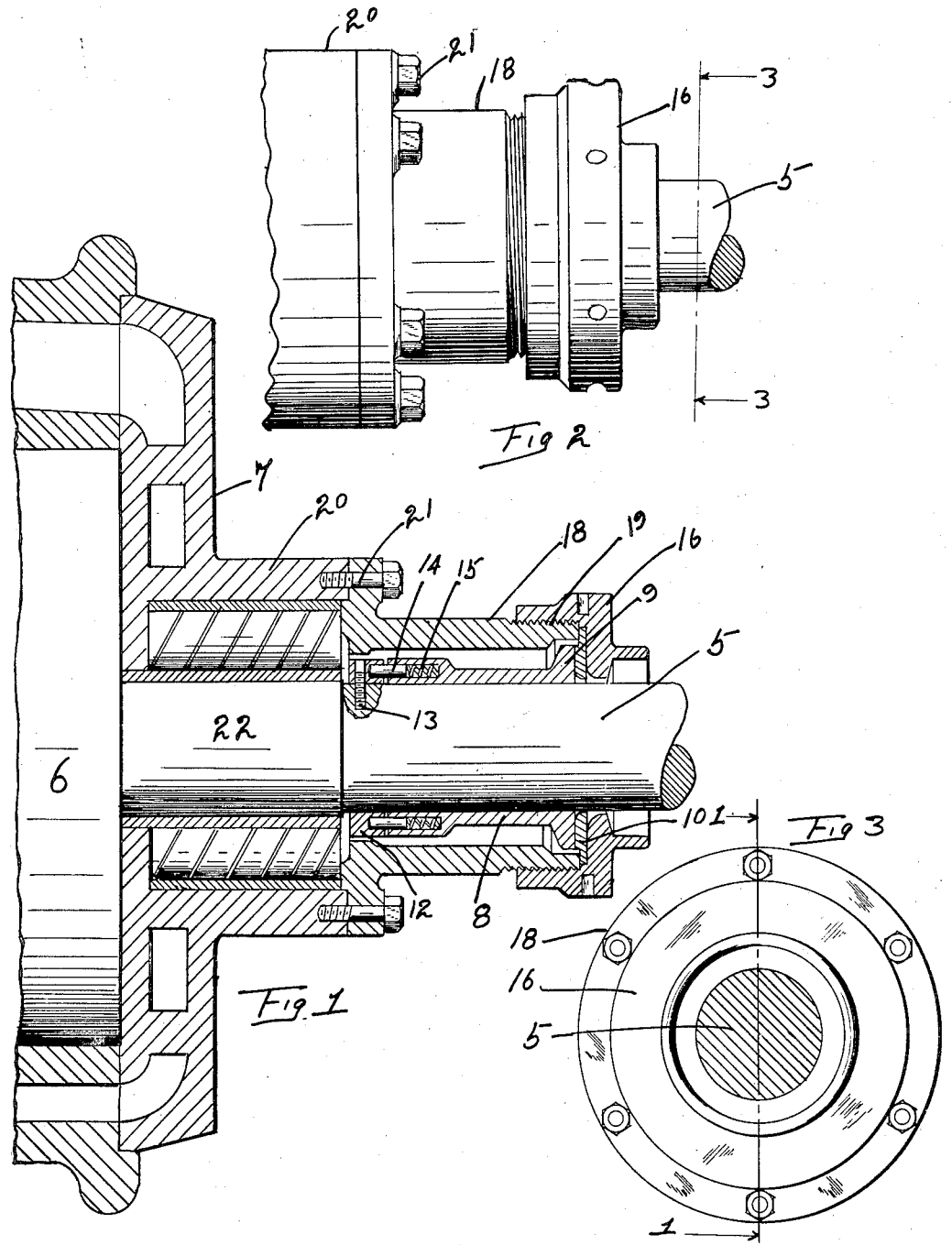
H. O. Jackson. Inventor
By A. J. O'Brien
Attorneys.

Patented Oct. 16, 1923.

1,470,621

UNITED STATES PATENT OFFICE.

HENRY O. JACKSON, OF DENVER, COLORADO, ASSIGNOR TO THE JACKSON COMPRESSOR COMPANY, A CORPORATION OF COLORADO.

STUFFING BOX.

Application filed December 16, 1919, Serial No. 345,220. Renewed August 23, 1922.

*To all whom it may concern:*

Be it known that I, HENRY O. JACKSON, a citizen of the United States, residing at the city and county of Denver and State of Colorado, have invented certain new and useful Improvements in Stuffing Boxes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in stuffing boxes adapted for use in all relations where fluid-tight joints are required. However, the special use which I have in mind is in connection with the rotor shaft of an air compressor, in which air and oil are circulated together within and through the rotor chamber, though it must be understood as above indicated, that my improvement is not limited to this special use, or to any special use, since it may be employed in all relations where ordinary stuffing boxes have heretofore been used.

An important characteristic of my improved stuffing box consists in the fact that it is entirely devoid of the ordinary packing material and consists only of metal parts.

Specifically, the device consists of a sleeve mounted on the journal of a shaft and arranged to rotate therewith, but longitudinally movable thereon to contact with a washer engaging a screw cap at the outer extremity of the journal. The sleeve is yieldably connected with a collar secured to the opposite extremity of the journal from the washer by means of pins, which engage recesses formed in both parts, the extremities of the pins which engage the sleeve being acted on by spiral springs. This packing sleeve structure is enclosed by an outer casing, which is stationary with the framework of the machine and to which the screw cap which maintain the washer or wearing member in place is applied.

Having briefly outlined my improvement, I will proceed to describe the same in detail, reference being made to the accompanying drawing, in which is illustrated an embodiment thereof. In this drawing:

Fig. 1 is a sectional view of my improved construction taken on line 1—1, Fig. 3, shown applied to the journal of a rotor shaft of an air compressor, a fragment only of the latter being shown.

Fig. 2 is an elevation of my improvement, showing the same broken beyond the body of the rotor casing shown in Fig. 1.

Fig. 3 is a section taken on the line 3—3 Fig. 1, looking towards the left.

The same reference characters indicate the same parts in all the views.

Let the numeral 5 designate the journal of a shaft which is connected with the rotor 6 of an air compressor 7, in which oil for lubricating purposes is circulated with the air or gas. The journal 5 of the rotor shaft is surrounded by a sleeve 8, having a circumferential flange 9, which increases the outer surface area of the sleeve where it comes in contact with a wearing washer 10, which may be composed of any suitable soft metal, while the sleeve 8 may, if desired, be made of cast iron. Applied to the inner extremity of the journal is a collar 12, which is secured to the shaft by a screw pin 13. The inner extremity of the sleeve 5 is arranged adjacent this collar and is connected therewith by means of pins 14, which engage registering recesses in the two parts, the recesses formed in the sleeve being relatively deep and provided with spiral springs 15, which act to yieldingly maintain the outer extremity of the sleeve 8 in contact with the washer 10, the latter being held in place by a screw-cap 16, surrounding the shaft and threaded upon an outer casing 18, as shown at 19. This casing member 18 is connected with the hub 20 of the rotor casing 7 by means of stud bolts 21, or in any other suitable manner.

The parts are so assembled that the sleeve 8 is movable longitudinally on the journal, whereby the pressure within the rotor casing acts to hold the outer extremity of the sleeve tightly against the washer 10, whereby a fluid-tight joint is formed between these parts. The oil within the rotor chamber lubricates the journal and forms a seal around the latter, and between it and the sleeve 8, a slight clearance, measured by one- or two-thousandths of an inch, being left for this purpose.

The inner extremity 22 of the journal is thoroughly lubricated by the oil within the rotor chamber, and this oil works out around the stuffing box portion 5 of the journal, whereby a fluid-tight seal is formed.

Attention is called to the fact that while the sleeve 8 rotates with the shaft, it is entirely free from the stationary surrounding sleeve 18, and only engages the washer 10 in wearing contact, since the washer 10 is the only part that is subjected, and this may be easily renewed at intervals at an exceedingly small cost.

It will thus be understood that my improved stuffing box construction provides the necessary seal for the journal of the shaft, notwithstanding no packing material of the character usually employed in such construction is utilized.

I claim:

Means for maintaining a fluid-tight joint around a rotatable shaft, comprising in combination with the shaft a sleeve, a collar secured to the inner extremity of a portion of the shaft to be sealed, a pin connection between the collar and the sleeve, the pin engaging registering recesses in the two parts, a spring located in the recess of one part and serving to act on the sleeve to move it outwardly on the shaft, a wearing washer at the outer extremity of the sleeve against which the sleeve bears, a stationary casing surrounding the sleeve and out of contact therewith and including a screw-cap applied to the body of said casing and clamping the wearing washer between the two members of the casing.

In testimony whereof I affix my signature.

HENRY O. JACKSON.